(12) United States Patent
Tan et al.

(10) Patent No.: US 8,000,305 B2
(45) Date of Patent: Aug. 16, 2011

(54) PREAMBLE SEQUENCING FOR RANDOM ACCESS CHANNEL IN A COMMUNICATION SYSTEM

(75) Inventors: Jun Tan, Lake Zurich, IL (US); Amitava Ghosh, Buffalo Grove, IL (US); Rapeepat Ratasuk, Hoffman Estates, IL (US); Fan Wang, Chicago, IL (US); Weimin Xiao, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 621 days.

(21) Appl. No.: 11/621,587

(22) Filed: Jan. 10, 2007

(65) Prior Publication Data

US 2007/0165567 A1    Jul. 19, 2007

Related U.S. Application Data

(60) Provisional application No. 60/759,697, filed on Jan. 17, 2006.

(51) Int. Cl.
*H04B 7/216* (2006.01)
(52) U.S. Cl. ........................... 370/335; 455/434
(58) Field of Classification Search .................. 370/335; 455/434
See application file for complete search history.

(56) References Cited

U.S. PATENT DOCUMENTS

| | | | | |
|---|---|---|---|---|
| 6,567,482 B1* | 5/2003 | Popovic' | | 375/343 |
| 6,804,307 B1* | 10/2004 | Popovic | | 375/299 |
| 6,901,104 B1* | 5/2005 | Du et al. | | 375/142 |
| 6,917,602 B2* | 7/2005 | Toskala et al. | | 370/335 |
| 6,967,942 B2* | 11/2005 | Smolinske et al. | | 370/346 |
| 2001/0017881 A1* | 8/2001 | Bhatoolaul et al. | | 375/130 |
| 2003/0031275 A1* | 2/2003 | Min et al. | | 375/326 |
| 2003/0103476 A1* | 6/2003 | Choi et al. | | 370/329 |
| 2004/0014452 A1* | 1/2004 | Lim et al. | | 455/403 |
| 2004/0264550 A1* | 12/2004 | Dabak | | 375/142 |
| 2005/0048920 A1 | 3/2005 | Liu | | |
| 2005/0084030 A1* | 4/2005 | Zhou et al. | | 375/267 |
| 2005/0143118 A1* | 6/2005 | Bernhardsson et al. | | 455/522 |
| 2005/0202818 A1* | 9/2005 | Hondo et al. | | 455/434 |
| 2006/0050799 A1* | 3/2006 | Hou et al. | | 375/260 |
| 2006/0126573 A1* | 6/2006 | Dick et al. | | 370/335 |

(Continued)

FOREIGN PATENT DOCUMENTS

EP    1 198 076 A1    4/2002

(Continued)

OTHER PUBLICATIONS

Multi_Carrier_and_Spread_Spectrum_Systems, by Fazel K. and Kaiser S.*
R1-051033 Further Topics on Uplink DFT-SOFDM for E-UTRA Agenda Item: 8.2, 3GPP TSG RAN WG1#42 bis, San Diego, USA, Oct. 10-14, 2005, pp. 1-24.

(Continued)

*Primary Examiner* — Jean Gelin
*Assistant Examiner* — Michael Nguyen

(57) ABSTRACT

A system and method for initializing a system communication without previous reservations for random access channel (RACH) access includes a first step of defining at least one spread sequence derived from at least one constant amplitude zero autocorrelation sequence. A next step includes combining the spread sequence with a Walsh code to form an extended spread sequence. A next step includes using the extended spread sequence in a preamble for a RACH. A next step includes sending the preamble to a BTS for acquisition. A next step includes monitoring for a positive acquisition indicator from the BTS. A next step includes scheduling the sending of a RACH message. A next step includes sending the RACH message.

13 Claims, 13 Drawing Sheets

U.S. PATENT DOCUMENTS

2008/0253323 A1* 10/2008 Fischer .................. 370/329

FOREIGN PATENT DOCUMENTS

WO     WO 2004-102979 A2    11/2004

OTHER PUBLICATIONS

IEEE 802.16 Broadband Wireless Access Working Group <http://ieee802.org/16>, Ranging Improvement for 802.16e OFDMA PHY, Jul. 7, 2004, IEEE C802.16e-04/143rl, pp. 1-43.

3GPP TSG RAN WG1 Ad Hoc on LTE, San Diego, USA, Oct. 10-14, 2005, Link Comparison of Localized vs. Distributed Pilot and Localized vs. Distributed Data, R1-0511153, pp. 1-5.

3GPP TSG RAN WG1 Meeting #42bis, San Diego, USA<Oct. 10-14, 2005, R1-051058, RACH Preamble Design, pp. 1-7.

Fazel et al, "Multi-Carrier and Spread Spectrum Systems," John Wiley & Sons, Ltd., ISBN 0-470-84899-5, entire document.

Blaine R. Copenheaver, "Corresponding Application PCT/US2007/060453—PCT International Search Report and Written Opinion," WIPO, ISA/US, Commissioner for Patents, Alexandria, VA, USA, Oct. 3, 2007, 9 pages, most relevant pp. 4, 7-9.

Yoshiko Kuwahara, "Corresponding Application PCT/US2007/060453—PCT International Preliminary Report on Patentability," The International Bureau of WIPO, Geneva, Switzerland, Jul. 31, 2008, 7 pages, most relevant pp. 2, 5-7.

* cited by examiner

RACH PARAMETERS FOR THE TDM/FDM STRUCTURE

| RACH PARAMETERS IN LOCALIZED MODE | BANDWIDTH | | | | | |
|---|---|---|---|---|---|---|
| | 1.25 MHz | 2.5 MHz | 5.0 MHz | 10.0 MHz | 15.0 MHz | 20.0 MHz |
| min. RB BW | 225 | 225 | 225 | 225 | 225 | 225 |
| # RB ($N_{RB}$) | 5 | 10 | 20 | 40 | 60 | 80 |
| # OF OCCUPIED SUBCARRIERS | 15 | 15 | 15 | 15 | 15 | 15 |
| # OF SEQUENCES (FOR ALL SECTORS/CELLS) ($N_S$) | 8 | 8 | 8 | 8 | 8 | 8 |
| # OF CYCLIC SHIFTED VERSION OF EACH SEQUENCE ($N_{SH}$) | 1 | 1 | 1 | 1 | 1 | 1 |
| # RACH OPPORTUNITIES | 40 | 80 | 160 | 320 | 480 | 640 |

*FIG. 2*

COMPARISON OF TDM/FDM AND HYBRID/CDM RACH (BW=5MHz).

| | TDM/FDM RACH | HYBRID/CDM RACH |
|---|---|---|
| NUMBER OF RACH OPPORTUNITIES (per ms) | $N_{RB} \times N_S \times N_{SH} \times N_{OFDM}$ WHERE $N_{OFDM}$ = NUMBER OF OFDM SYMBOL RESERVED FOR RACH per ms e.g. 160X $N_{OFDM}$ FROM TABLE 1. | 20 |
| *INTERFACE GENERATED TO SCHEDULED USERS* | NONE | SMALL |
| SNR REQUIREMENT FOR 1% FALSE ALARM AND MISSED DETECTION ERROR (TU 3 Km/h) | -2 dB | -17 dB |
| RACH OVERHEAD (per ms) | $N_{OFDM}/14$ | NONE |
| COLLISION PROBABILITY | LOW | MEDIUM - HIGH |
| INTER-CELL INTERFERENCE | MEDIUM | LOW |
| SYSTEM INTERFERENCE LIMITED | YES | NO (COLLISION LIMITED) |

*FIG. 13*

PREAMBLE SEQUENCING FOR RANDOM ACCESS CHANNEL IN A COMMUNICATION SYSTEM

Applicant hereby claims domestic priority benefits of Application No. 60/759,697 filed on Jan. 17, 2006, and the contents of which are incorporated by reference herein.

TECHNICAL FIELD OF THE INVENTION

This invention relates generally to communications and more particularly to use of a random access channel in a communication system.

BACKGROUND OF THE INVENTION

Various communications protocols are known in the art. For example, the Third Generation Partnership Project (3GPP) has been working towards developing a number of protocols for use with a wireless communication path. The original scope of 3GPP was to produce globally applicable technical specifications and technical reports for a 3rd generation mobile system based on evolved Global System for Mobile communication (GSM) core networks and the radio access technologies that they support, such as Evolved Universal Terrestrial Radio Access (EUTRA) including both Frequency Division Duplex (FDD) and Time Division Duplex (TDD) modes. 3GPP's scope was subsequently amended to include the maintenance and development of GSM technical specifications and technical reports including evolved radio access technologies (e.g. General Packet Radio Service (GPRS) and Enhanced Data rates for GSM Evolution (EDGE)).

Presently, EUTRA calls for a random access channel (RACH) protocol and in particular a physical random access procedure requiring reserved resources for RACH access. The RACH channel is used for initial access to the network as well as to transmit small to medium amount of control information and data packets. This 3GPP UMTS specification permits an overall procedure that allows for various protocol/operational states to suit varying degrees of needed, anticipated, and/or desired operational activity for transmission of data packets. Unfortunately, for some desired applications using small of medium amounts of control information and data packets, the amount of data transmission activity appears to underutilize these reserved RACH resources, thereby wasting transmission resources.

The RACH (random access channel) is essential for initial access to the network, for the transmission of control information and data packets. The initial access channel has different names in different systems, such as RACH in the context of 3GPP, or ranging in the context of IEEE std. 802.16e. In this invention, we use RACH in its general sense to represent the initial access channel of communication systems.

It is desired that the RACH include a contention channel, fast acquisition of preamble, minimization of interference, minimum impact on other scheduled data transmission, and low data rate transmission for short data/control messages. Several options are available for multiplexing between the RACH and scheduled-based channels; Time Division Multiplexing (TDM), Frequency Division Multiplexing (FDM), and Code Division Multiplexing (CDM). However, in the 3GPP system problems arise for multiplexing between RACH and scheduled-based channels using either TDM or FDM. In particular, TDM requires reservation of slots for RACH access, and FDM requires a frequency (subcarrier) reservation for RACH access. In either case, a resource reservation is allotted even if there are few RACH requests in the system, which withholds unused resources that adversely affect system capacity. CDM transmission, on the other hand, will generate interference to other uplink users.

To control interference generated by CDM transmission, a MC-CDMA (multi-carrier code division multiple access) technique can be applied for RACH design without reserving system resources. This invention uses this technique for non-reserved RACH access of EUTRA communication system.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

FIG. 2 is a table of RACH parameters for the structure of FIG. 1;

FIG. 13 is a table showing a comparison of the TDM/FDM and hybrid/CDM embodiments of the present invention.

Skilled artisans will appreciate that common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENT

To minimize the performance impact to scheduled users, the present invention presents a hybrid approach to the RACH preamble in an EUTRA system. Specifically, the RACH preamble is transmitted in a CDM manner, while the message is either scheduled by the Node B in the same manner as regular data transmission, contention based transmitted, or ACK based transmitted. With proper configuration of the preamble sequence, the amount of interference generated can be minimized. In addition, the message portion is scheduled, whereby variable data rates can be supported with no impact to other uplink users. Moreover, both TDM/FDM and Hybrid/CDM techniques can be utilized as candidate RACH methods for EUTRA, as will be detailed below.

Figure 1:
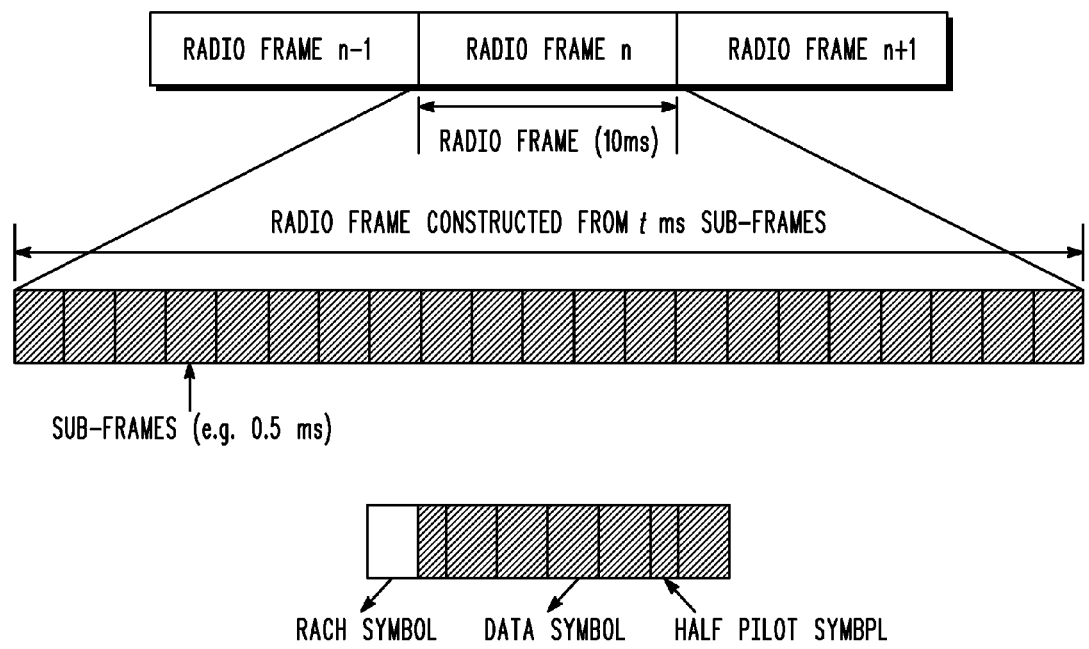
FIG. 1 illustrates a TDM/FDM RACH structure.

A RACH preamble can be sequenced using TDM/FDM. In this scheme a dedicated or special symbol is used for RACH. The RACH symbol can be reserved every x frames (e.g. x=1 . . . 10) as shown in FIG. 1. The scheme can use either localized or distributed mode. In the localized mode the subcarriers are divided into $N_{RB}$ resource blocks with each resource block using a fixed number of contiguous sub-carriers. Next, for each of the $N_{RB}$ resource blocks, a number of signature sequence groups are pre-defined so that every group consists of $N_S$ signature sequences and different groups can be assigned to different neighboring sectors. Each group also consists of several cyclically shifted versions of the signature sequences ($N_{SH}$). As such, the total number of RACH opportunities per DFT-SOFDM symbol is given by $N_{RB}*N_S*N_{SH}$.

As an example for 5 MHz bandwidth, all 300 subcarriers are divided into twenty resource blocks with $N_{RB}$=20. A RACH signature sequence occupies fifteen subcarriers corresponding to 225 kHz bandwidth, thus the length of a signature sequence is fifteen. For the scalable bandwidth structure, the length of a signature sequence is fixed to fifteen. The number of RACH opportunities thus varies according to different bandwidth deployments. Detailed numerology is shown in FIG. 2 for a set of scalable bandwidth.

Dividing the RACH opportunities into resource blocks provides the opportunity to take advantage of channel frequency selective characteristics to further improve the performance. The user equipment (UE) chooses the best available resource blocks for RACH preamble transmission based on information of the current frequency selective nature of the channel.

In general, the signature sequences are obtained from a constant amplitude zero autocorreleation (CAZAC) sequence, which include different "classes" of generalized chirp like (GCL) or Chu-sequences which are complex valued and have unit amplitude. The GCL/Chu sequence has low cross correlation at all time lags which improves the detection performance. As used herein, the CAZAC, Chu and GCL sequences can be used interchangeably.

The numbers of RACH groups for different bandwidths are summarized in FIG. 2. The total RACH overhead is dependent on the reserved RACH access rate. For example, if the RACH access is reserved every 1 millisecond, the RACH overhead is 1/14=7.1%.

Figure 3:
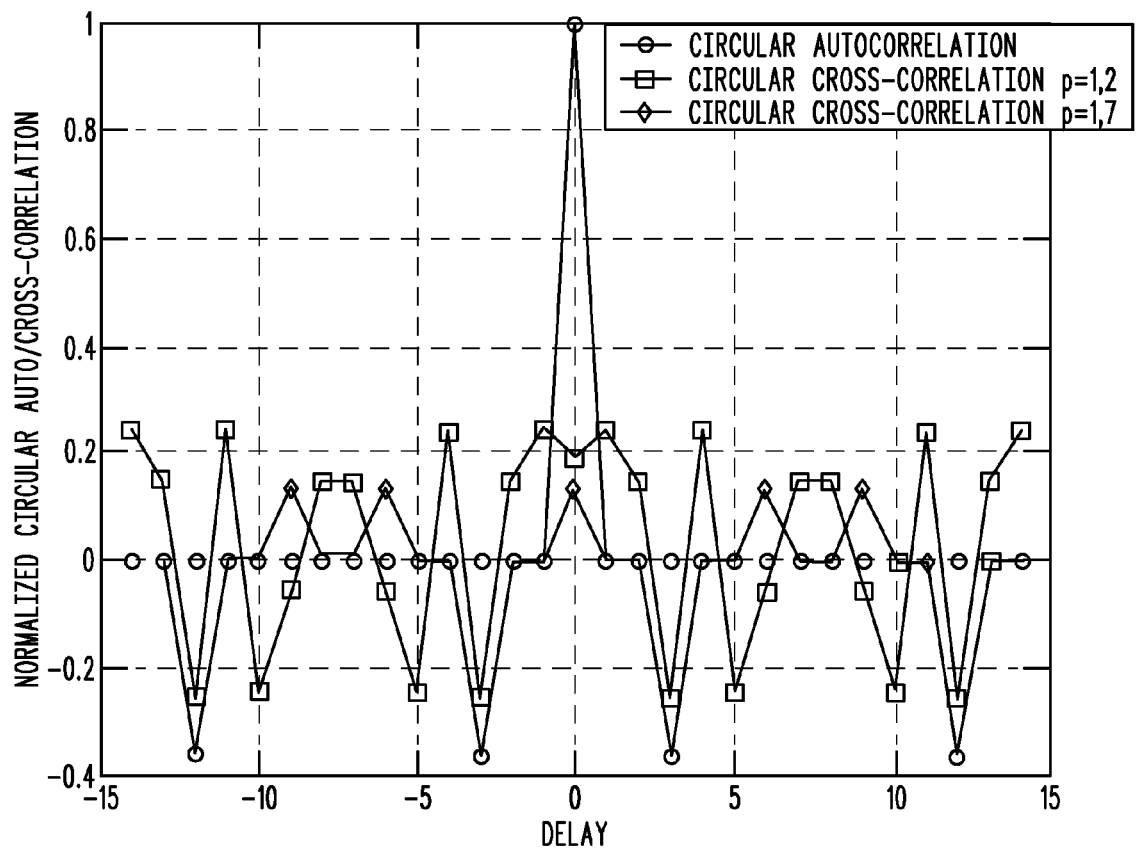
FIG. 3 is a graphical representation of a circular auto/cross correlation of a Chu-sequence with M=15, in accordance with the present invention.

Specific RACH preamble sequencing can be defined. Since the sequence length equals to fifteen, a Chu-sequence can be selected which is defined as $$g_n = e^{-j\frac{2\pi 1}{M2}pn(n+1)}, n = 0, 1, \ldots, M-1$$

where M=15, and p is relatively prime to M. In this case, p={1,2,4,7,8,11,13,14, . . . }. For a fixed p, the Chu-sequence is orthogonal to its time-shift. For a different p, Chu-sequences are not orthogonal. The circular autocorrelation and cross-correlation properties of a Chu sequence is shown in FIG. 3. FIG. 3 shows that Chu sequence has optimal autocorrelation property, while its cross-correlation has relatively small value for different delays.

If the preamble is detected at the Node-B, the Node-B sends an ACKnowledge. Upon detection of the ACK at the UE, the UE sends the message part in the next slot using the same resource block (RB) location which was used to send the preamble. As an alternative, if the system is lightly loaded the message can be scheduled as outlined below.

In accordance with the present invention, a hybrid/CDM approach is used for the RACH preamble configuration. To minimize uplink interference, the RACH preamble is designed to use time-frequency spreading with a long spreading factor. With this approach, no reservation of symbols and sub-carriers are required and uplink interference generated is minimal (e.g. 27.8 dB reduction with a spreading gain of 600). In addition, a simple receiver structure with frequency domain processing can be used to process the preamble. The RACH preamble structure is summarized as follows: a) the preamble length is 1 millisecond using two 0.5 millisecond sub-frames; a total of 4200 chips excluding Cyclic Prefix length, b) frequency spreading with spreading factor M using a Chu-sequence (complex quadratic sequence), where M is the occupied sub-carriers excluding DC (direct current) component, c) time spreading with a Walsh sequence of length two, d) signature sequences with combined spreading factor 2×M out of which a total of twenty are used, and e) a repetition of seven is used to rate-match the preamble sequence length to one millisecond.

The Chu-sequence (complex quadratic sequence) or GCL sequence is given by $$g_n = e^{-j\frac{\pi}{8}}e^{-j\frac{2\pi 1}{M2}n^2}, n = 0, \ldots, M-1$$

and the delayed Chu-sequence is given by $$g_{d,n} = g_{(n-30d)\mod M}, d=0, \ldots 9$$

Note that the Chu-sequence is a special sequence of the GCL sequence class. Other GCL sequences can be applied as the signature sequence as well. For example, for even M, we can define $g_n$ as $$g_n = e^{-j\frac{2\pi 1}{M2}pn^2 - j\frac{2\pi}{M}pqn}, n = 0, \ldots, M-1$$

where p is an integer relatively prime to M, and q is any integer. To provide temporal spreading, a Walsh sequence of length two is used; w=0, 1. The sequence is given by $$w^0 = \{+1, +1\}, w^1 = \{+1, -1\}$$

To generate the twenty unique signature sequences, a sequence identifier s is first computed via s=2×d+k where d=0, . . . 9 corresponds to the delay of the Chu-sequence and k=0,1 is the index of the Walsh sequence. The resulting s-th RACH preamble signature sequence (with length 2M) is then given by $$P_s=[w^k(0)g_{d,n}\ w^k(1)g_{d,n+M}],\ n=0,\ldots,M-1$$

Figure 7:
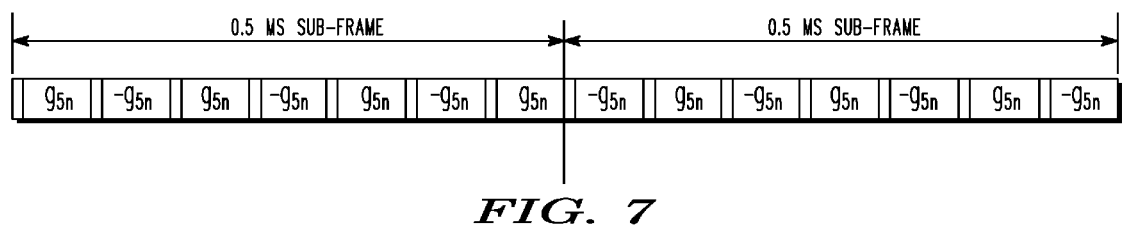
FIG. 7 is a graph of an example of a RACH preamble, in accordance with the present invention.

An example of the RACH preamble sequence is shown in FIG. 7. In this case, d=5, and k=1 with a resulting sequence index number of eleven. The sequence $P_{11}$, made up of $g_{5,n}$ and $-g_{5,n}$ (i.e. Walsh code $\{1,-1\}$) is then repeated seven times in order to cover 1 millisecond.

To mitigate inter-cell interference of RACH channel, different Chu-sequences or GCL sequences can be used for different sectors/cells. A generalized Chu-sequence is given by:

$$g_n = e^{-j\frac{2\pi 1}{M2}pn},\ n=1,\ldots,M-1$$

where p is chosen such that the greatest common divisor of p and M is 1. For example, when M=300, and p represents the prime numbers $\{1,7,11,13,17,19,23,29,31,37,\ldots\}$. Given a fixed p, the corresponding Chu-sequence is orthogonal when it is shifted circularly. However, the sequences are not orthogonal for different p and behave as random sequences. Thus, by assigning different p to different sector/cell, inter-cell interference can be mitigated.

Figure 8:
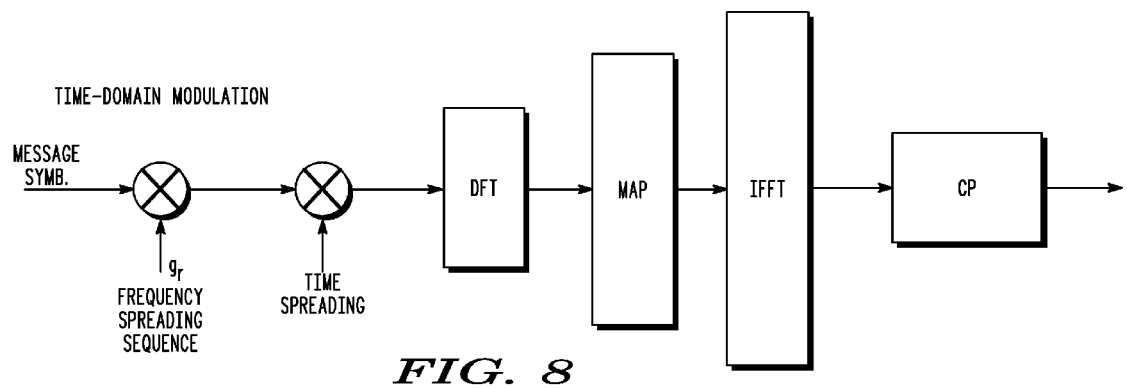
FIG. 8 is a block diagram of RACH preamble generation using time-domain modulation, in accordance with the present invention.
Figure 9:
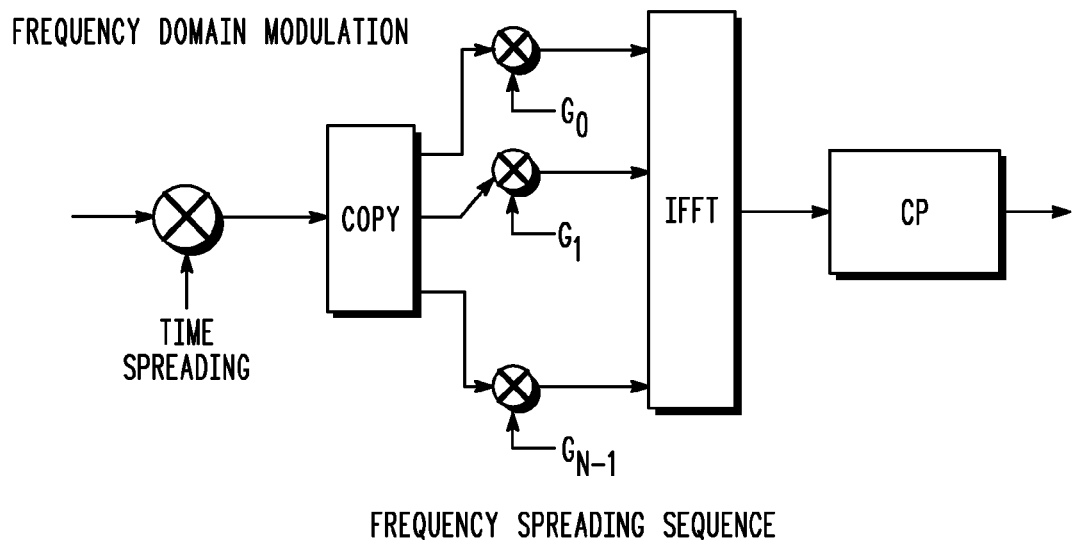
FIG. 9 is a block diagram of RACH preamble generation using frequency-domain modulation, in accordance with the present invention.

RACH preamble generation can be accomplished using either time-domain modulation (FIG. 8) or frequency-domain generation (FIG. 9). In time-domain modulation, a message symbol is mixed with a frequency-spreading sequence as described herein in accordance with the present invention. The combined signal is then processed using time-spreading, followed by a Discrete Fourier Transform (DFT), mapping, Inverse Fast Fourier Transform (IFFT), and Cyclic Prefix (CP), as are known in the art. In frequency-domain modulation is first processed using time-spreading, which is copied to multiple paths, as are known in the art. These different paths are then mixed with frequency-spreading sequence as described herein in accordance with the present invention. The combined signals are then processed by an Inverse Fast Fourier Transform (IFFT), and Cyclic Prefix (CP), as are known in the art.

Figure 10:
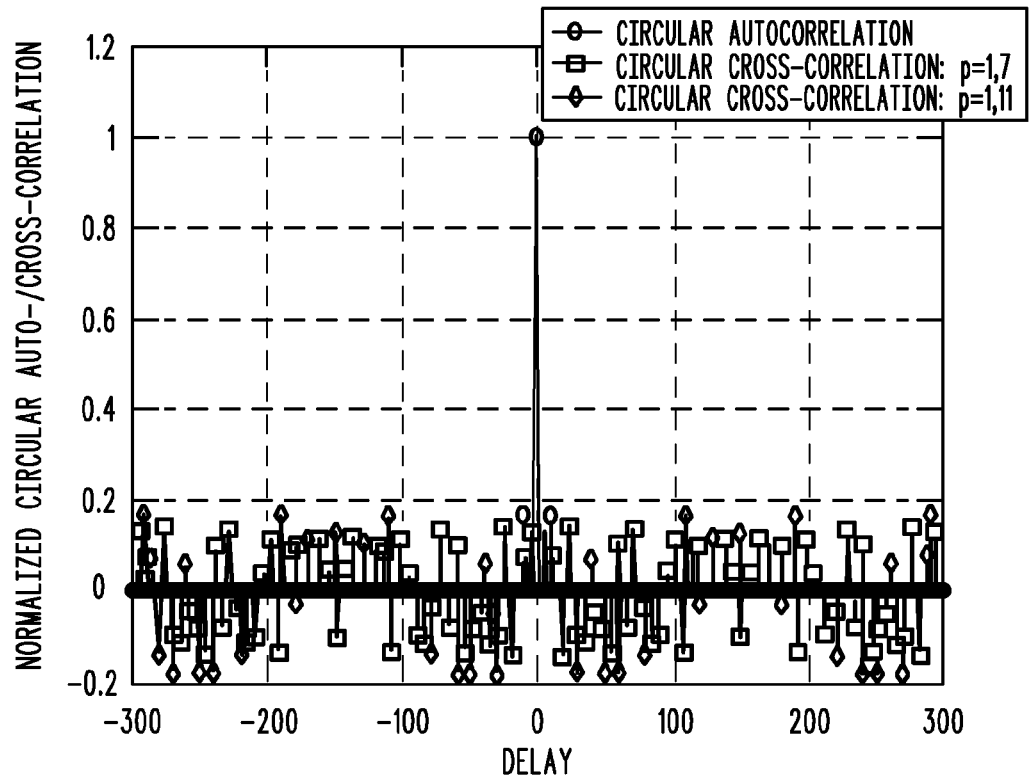
FIG. 10 is a graphical representation of a circular auto/cross correlation of a Chu-sequence with M=300, in accordance with the present invention.
Figure 11:
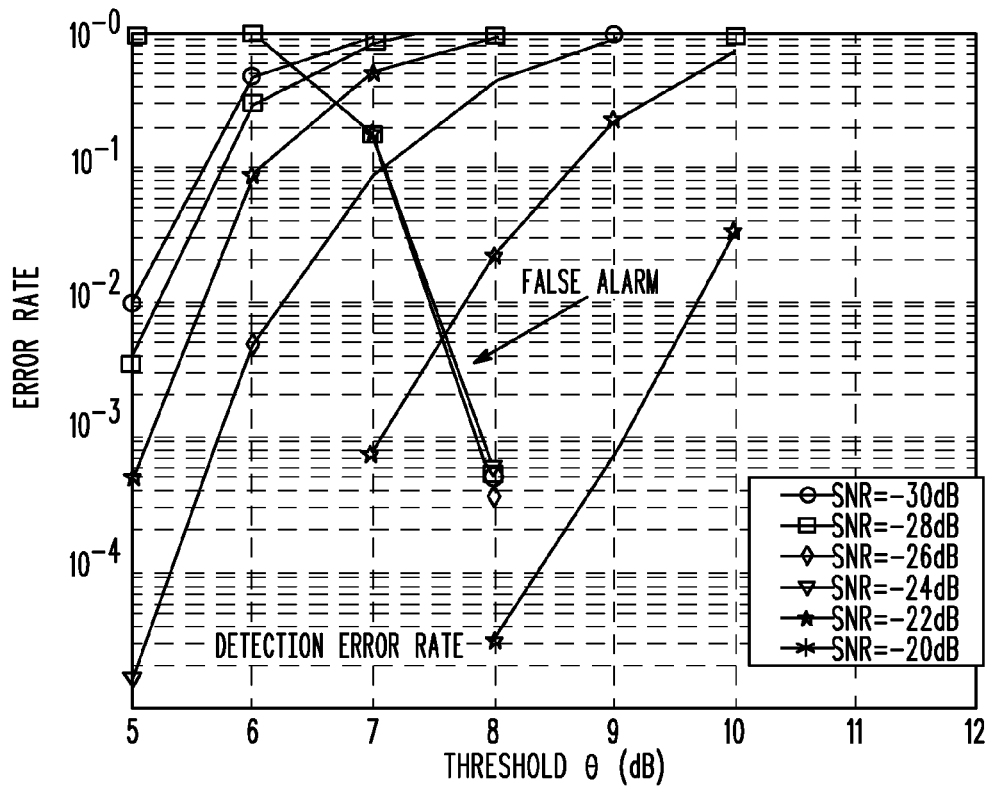
FIG. 11 is a graphical representation of RACH detection error and false alarm performance over an AWGN channel, in accordance with the present invention.
Figure 12:
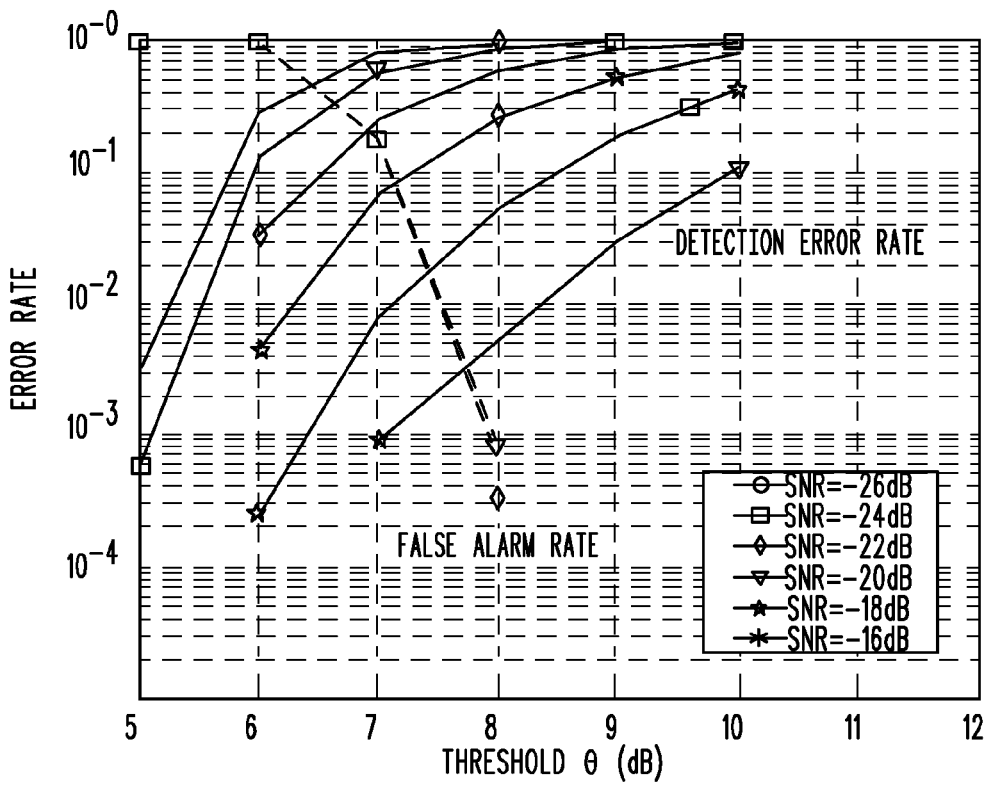
FIG. 12 is a graphical representation of RACH detection error and false alarm performance over an TU channel at 3 kilometers/hour, in accordance with the present invention.

The circular autocorrelation and cross correlation properties for M=300 is shown in FIG. 10. This figure illustrates an optimal property of circular autocorrelation and good cross correlation performance of Chu-sequence with length 300. FIGS. 11 and 12 show the RACH preamble detection error rate and false alarm rate for AWGN and TU (typical urban) channel. The RACH preamble detection is outlined above. In this case, BW=5 MHz, corresponding to a Chu-sequence of length 300. Compared to the power requirement for data transmission, it is seen that the transmit power of the CDM RACH preamble is significantly less (20-30 dB lower) per user. As a result, interference generated by the RACH preamble is expected to be insignificant for lightly loaded system.

The RACH preamble detection is similar to the detection algorithm of TDM/FDM-based RACH at a Node-B. The block-by-block detection utilizes frequency-domain correlation, which is suitable for Frequency Domain Equalization (FDE). There is no time-domain correlation needed, which makes calculations less complex. For example, assume an UE randomly selects a RACH preamble sequence with sequence identifier number s. The 2M length RACH sequence is $$P_s=[w^k(0)g_{d,n}\ w^k(1)g_{d,n+M}],\ n=0,\ldots,M-1$$

where s=2×d+k. At the receiver side of Node-B, the received signal can be represented as $$y_n = x_n \otimes h_n + z_n,$$

where $\otimes$ indicates circular convolution, $h_n$ is channel impulse response, $z_n$ is the channel noise, and $x_n$ is either $w^k(0)g_{d,n}$ or $w^k(1)g_{d,n}$.

At the receiver the circular (periodic) correlation of sequence $g_n$ and $y_n$ is computed. This yields $$c_m = \frac{1}{\sqrt{M}} \sum_{n=0}^{M-1} y_n g^*_{(n-m)\bmod M}$$

The correlation can be performed either in time or frequency domain. Through some simple manipulations, the following is obtained $$c_m = \begin{cases} \sqrt{M}\ h_{m-30d} + z'_m & k=0 \\ -\sqrt{M}\ h_{m-30d} + z'_m & k=1 \end{cases},$$

where the term $z_m'$ is the equivalent channel noise. Usually the channel maximum delay is assumed to be less than the length of cyclic prefix. Here, it is assumed that the maximum channel delay is less than thirty signal chips. For 5 MHz bandwidth deployment, the length of thirty chips using current E-UTRA numerology equals to 6.67 microseconds.

Since there are two Walsh sequence for k=0 and k=1, one can combine the nearby two blocks for both Walsh sequences. There are a total of fourteen blocks of which one 2M RACH sequence uses two blocks. Two neighbor $c_m$ are added to yield seven correlation sequences for k=0. For k=1, two neighbor $c_m$ are subtracted accordingly to yield another seven correlation sequences for k=1. In the next step, we detect the delay index d, so that the RACH sequence identifier number s (s=2×d+k) can be obtained.

Figure 4:
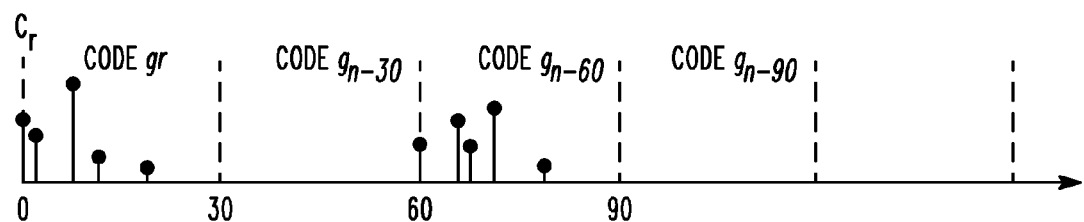
FIG. 4 is a graphical representation of a correlation sequence in the presence of two RACH requests with delays of 0 and 2, in accordance with the present invention.

From the correlation sequence $c_m$, when a RACH request with delay index d is present, the channel impulse response will appear in the frame $\{30d, 30d+30\}$, as illustrated in FIG. 4. The figure shows two RACH requests with sequence delay 0 and sequence delay 2. The correlation sequence $c_m$ indicates corresponding channel impulse response at $\{0-30\}$ and $\{60-90\}$ regions. By detecting power in different regions, one can thus detect the RACH preamble at the Node-B.

It is possible to have a ML (maximum likelihood) optimal detection of the RACH request if the channel impulse response is known. However, usually such channel information is not available to the receiver at the Node-B. A simple detection algorithm is the maximum power detection. When the maximum power in a certain region is greater than a power threshold, a RACH request corresponding to that region is assumed.

The detection algorithm has three steps. First, calculate average power of correlation sequence. This yields $$\overline{P} = \frac{1}{M} \sum_{m=0}^{M-1} |c_m|^2.$$

The second step is to find the maximum power in all regions to obtain $$\gamma_d = \frac{1}{\overline{P}} \max_{m-30d}^{30d+29} |c_m|^2.$$

The final step is to check whether the maximum power is greater than a pre-defined power threshold $\gamma_{TH}$. Thus, $$\begin{cases} \gamma_d \geq \gamma_{TH} & RACH \text{ request with delay } d \text{ is present} \\ \gamma_d < \gamma_{TH} & RACH \text{ request with delay } d \text{ is absent} \end{cases}.$$

With the detected d, and its corresponding Walsh code index k, the RACH sequence identifier number s, can be obtained through s=2d+k.

Figure 5:
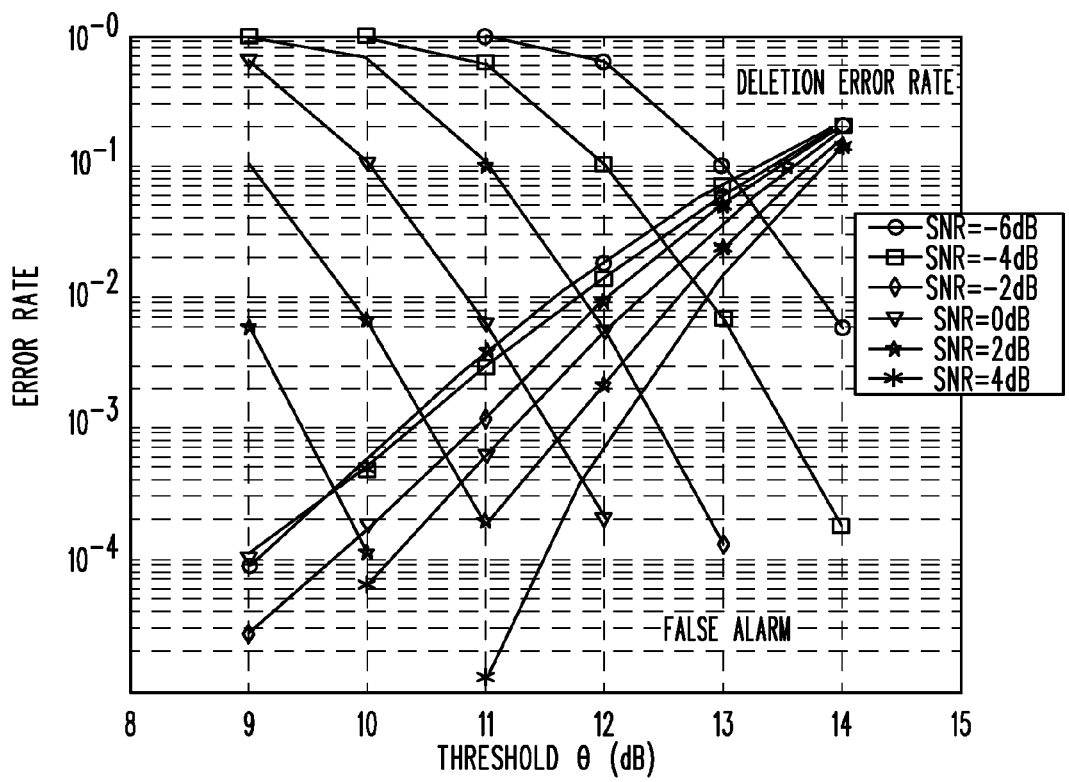
FIG. 5 is a graphical representation of a detection error rate and false alarm performance of TDM-RACH over an AWGN channel, in accordance with the present invention.
Figure 6:
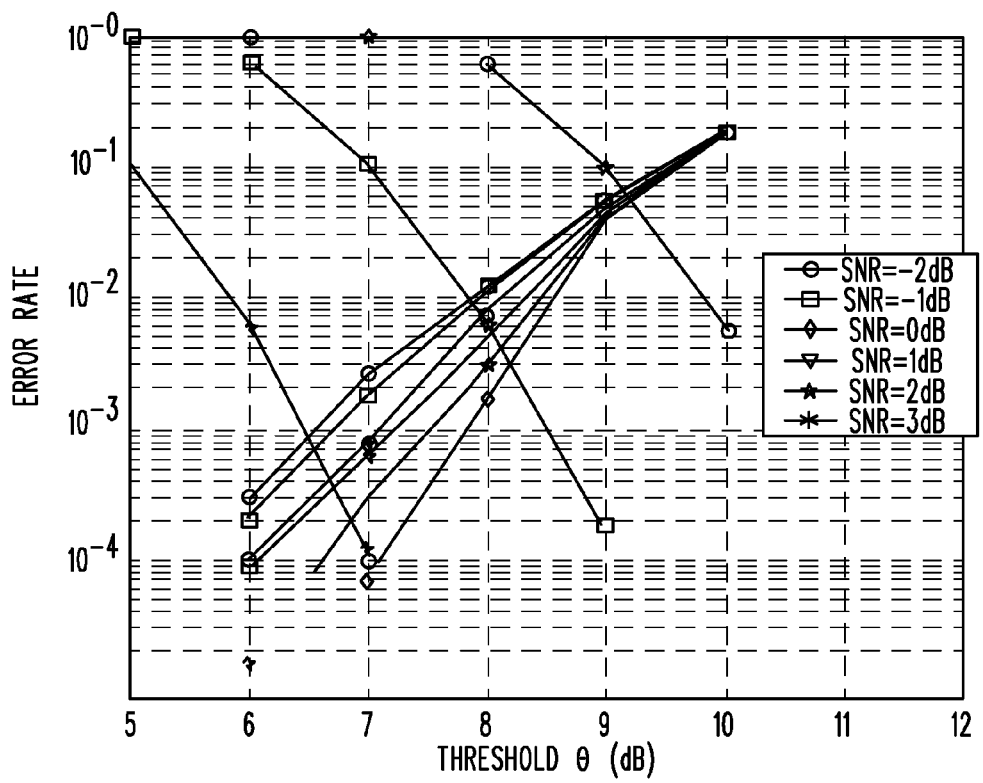
FIG. 6 is a graphical representation of a detection error rate and false alarm performance of TDM-RACH over an TU channel at 3 kilometers/hour, in accordance with the present invention.

The above technique detects the received power based on correlation of the received sequence to all the possible sequences. The correlation can be carried out either in time or frequency domain. Once the detected power is greater than a pre-defined power threshold, a RACH preamble is detected. Naturally, the choice of threshold determines detection performance. FIGS. 5 and 6 illustrate detection performance of the TDM/FDM RACH preamble under AWGN and TU (typical urban) propagation channels, respectively. The following definitions were used in the performance evaluation: a) false alarm refers to a scenario where a particular code was detected when nothing or a different code was transmitted, and b) detection error refers to when a particular code was transmitted but not detected.

To maximize capacity utilization in the uplink, there are three approaches for RACH message transmission. At first, RACH message transmission can be scheduled by the Node B on a time-frequency region reserved specifically for RACH message transmissions. These regions are fixed and known beforehand so as to minimize control message overhead. The frequency, size, and number of these RACH messages regions will depend on system design and deployment scenarios. Naturally, when there is no RACH message transmission, the Node B can schedule other users in these time-frequency regions. At the Node B, once the RACH preamble is successfully received, a four-bit acknowledgement corresponding to the sequence number is transmitted to the UE. This is done even when the UE may not be scheduled for some time to prevent the UE from transmitting the RACH preamble again. Subsequent to receiving an acknowledgement, the UE monitors the downlink control channel for a period of time for scheduling information in order to transmit the RACH message. Due to the use of micro-sleep mode, power consumption from monitoring the downlink control channel is not expected to be an issue. In addition, the UE may already need to monitor the downlink control channel for possible downlink data transmission.

The second RACH message transmission approach can be contention based. Once UE receives ACK from Node-B for RACH access, UE sends the RACH message in the pre-defined channel. Then UE can further monitor downlink control channel for further ACK information for the transmitted RACH message.

The third RACH message transmission approach is ACK based. With this approach, a resource block for message transmission is reserved by Node-B once needed. The RACH ACK information indicates the readiness of the reserved channel. Once UE receives this ACK information, the RACH message is sent in the reserved channel.

FIG. 13 compares the RACH features between the TDM/FDM technique and the Hybrid/CDM embodiments of the present invention.

Figure 14:
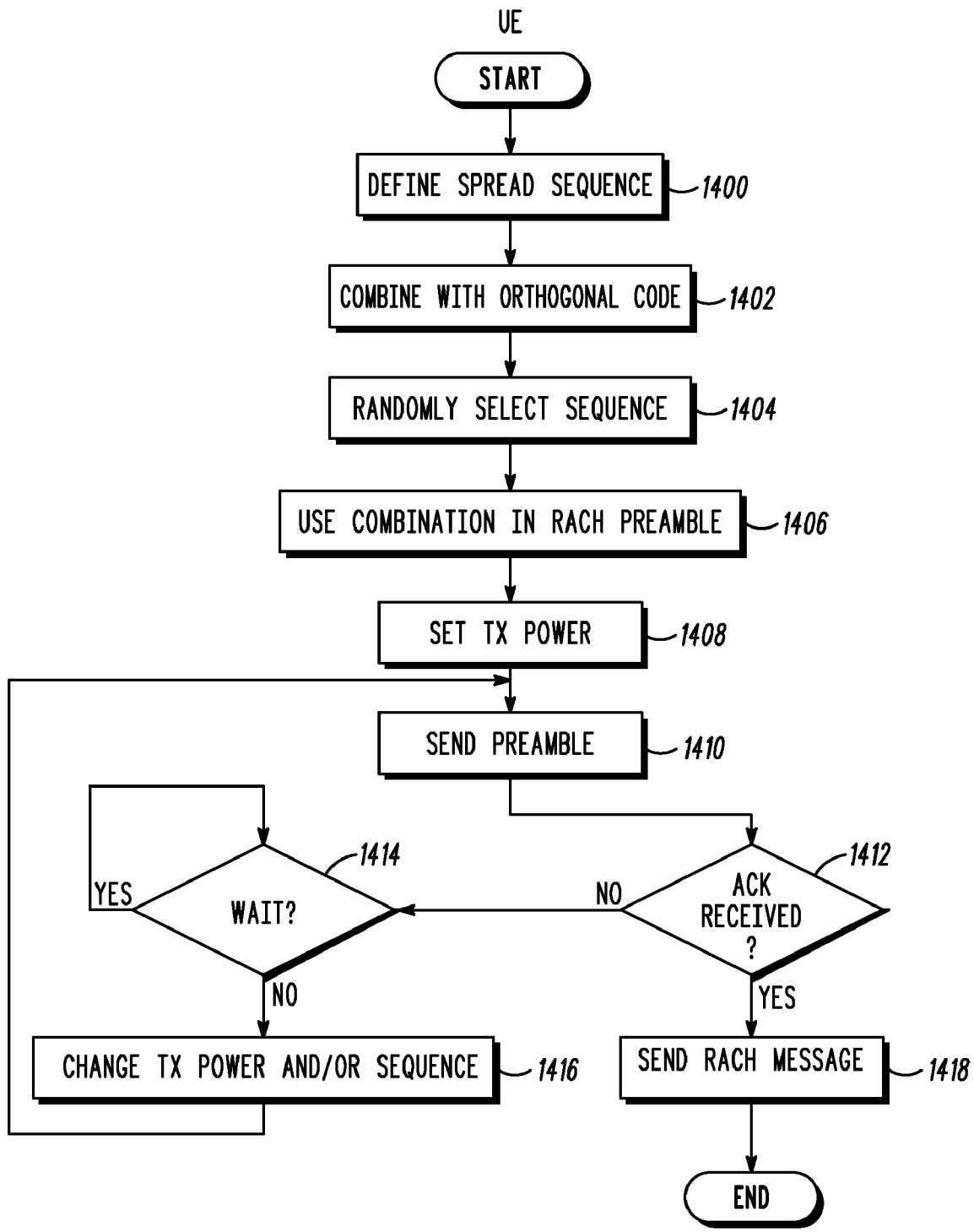
FIG. 14 comprises a flow diagram of a method, in accordance with the present invention.
Figure 15:
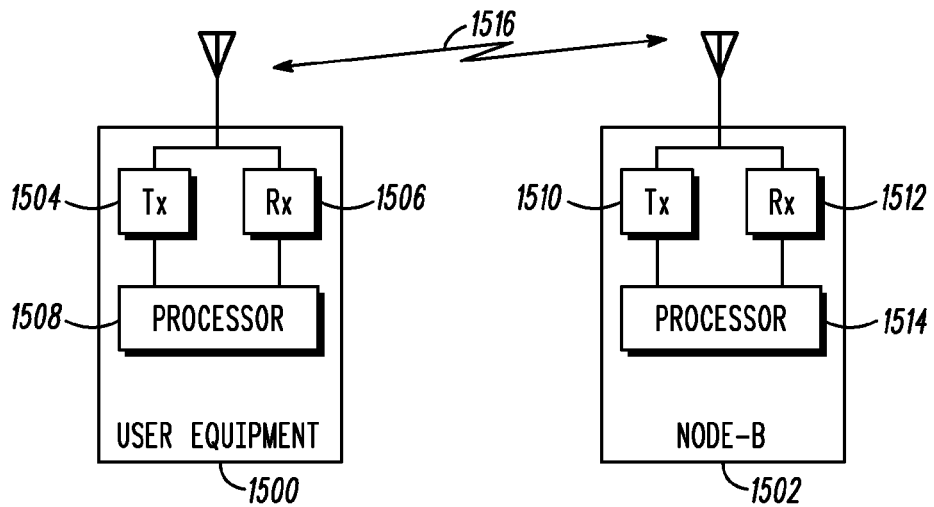
FIG. 15 illustrates a block diagram of a communication system, in accordance with the present invention.

Referring to FIG. 14, the present invention also provides a method for random channel access between a user equipment (UE) and a Node-B of a EUTRA communication system, as shown in FIG. 15, wherein the UE 1500 reserves and transmits information on the RACH channel 1516, and the Node-B 1502 receives the information on the RACH channel. However it should be recognized that the present invention is applicable to other systems including 3GPP, 3GPP2, and 802.16 communication systems, and that the terms 'user equipment' can be used interchangeably with 'mobile station', and that 'base station', 'BTS' and 'node-B' can be used interchangeably, as are known in the art. The UE 1500 includes a transmitter 1504, receiver 1506, and processor 1508 coupled thereto. The node-B 1502 also includes a transmitter 1510, receiver 1512, and processor 1514 coupled thereto.

In a first step, the UE 1500 defines 1400 a plurality of spread sequences derived from a plurality of constant amplitude zero autocorrelation (CAZAC) sequences. Specifically, the sequences can be Chu-sequences or GCL sequences. In addition, the sequence may be delayed. The UE then combines 1402 the spread sequences with an orthogonal code (e.g. Walsh code) to form extended spread sequences (signature sequences). In a next step, the UE selects 1404 one of the signature sequences, which is used 1406 in a preamble for a RACH. Preferably, the selection is randomly selected. However, the select sequence could be predefined or selected to reduce the possibility of interference.

Figure 16:
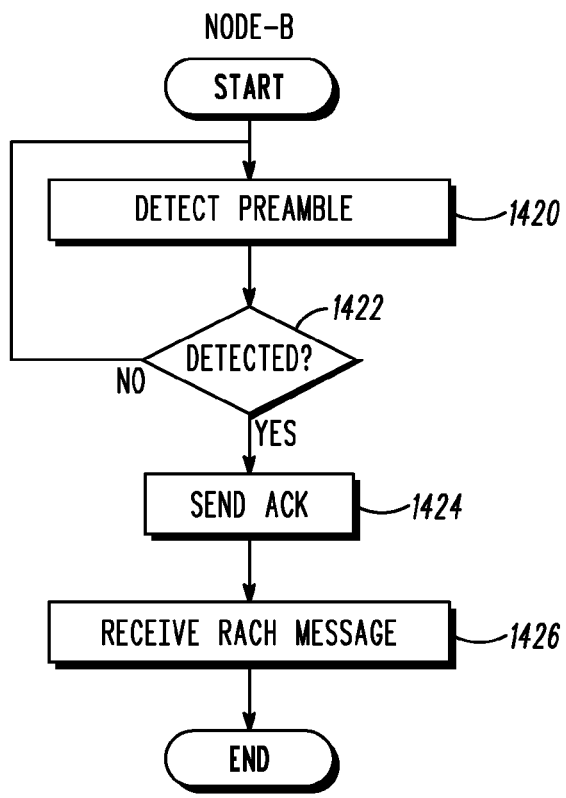
FIG. 16 illustrates the procedure of preamble detection in Node-B.

The UE then determines an available RACH access slot and other transmission parameters. In a next step, the UE sets 1408 a transmission power. In a next step, the UE transmits 1410 the RACH preamble using the selected slot, signature sequence, and power, and then monitors 1412 for a positive acquisition indicator (ACKnowledgement) from the node-B 1502. If no positive acquisition indicator is detected, in a next step, the UE may wait 1414 for a period of time or the UE changes 1416 transmission power with a new access slot and a new randomly selected signature until the maximum number of transmissions or maximum power is reached. If positive acquisition indicator is detected, in a next step, the UE sends 1418 RACH message to Node-B. FIG. 16 illustrates the procedure of preamble detection in Node-B 1502. Node-B detects 1420 preamble until the preamble is detected 1422. Then the RACH ACK is sent 1424 to UE. The next step will be the RACH message transmission.

There are three approaches for RACH message transmission. The details of message transmitting 1418 in UE and message receiving 1426 in Node-B will be illustrated in FIGS. 17, 18, and 19.

Figure 17:
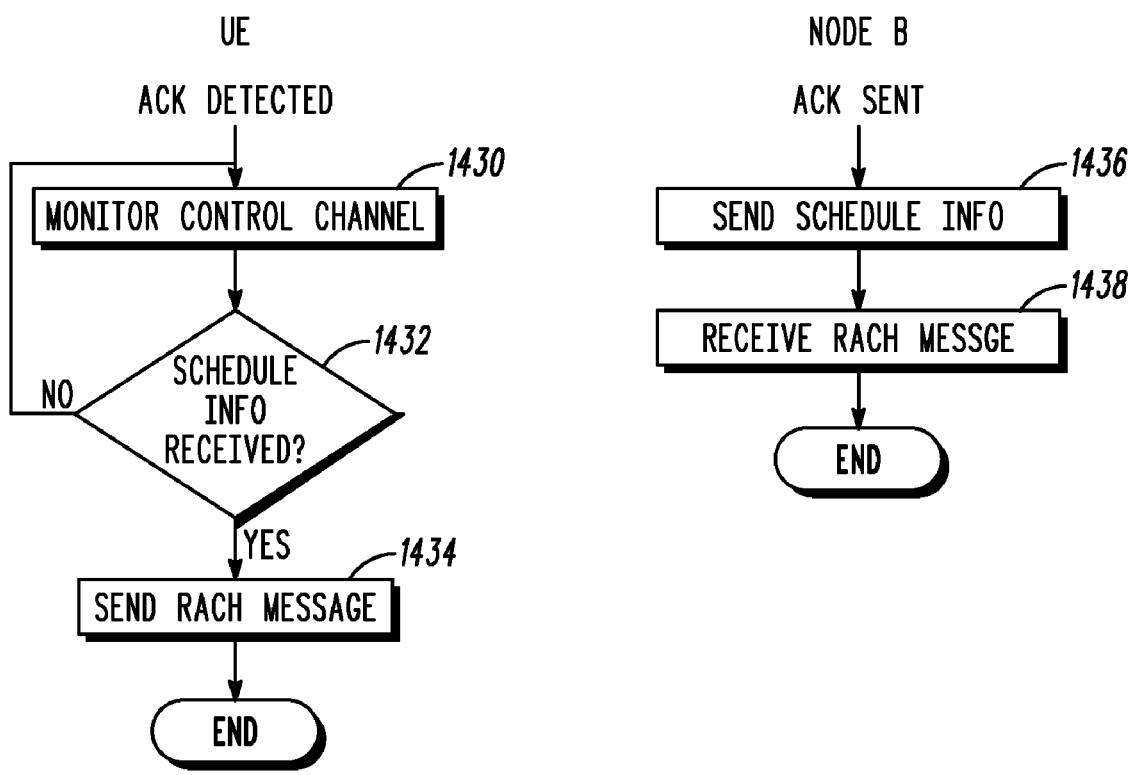
FIG. 17 is the method of schedule-based RACH message transmission.

FIG. 17 is the method of schedule-based RACH message transmission. UE monitors 1430 the downlink control channel for a fixed amount of time to obtain 1432 scheduling information for the RACH message. The Node-B can be signaled for RACH message transmission, and the RACH message can then be sent 1434 as scheduled. Node-B schedules 1436 RACH message transmission after the RACH ACK is sent. Node-B will receive 1438 RACH message at its scheduled time and frequency.

Figure 18:
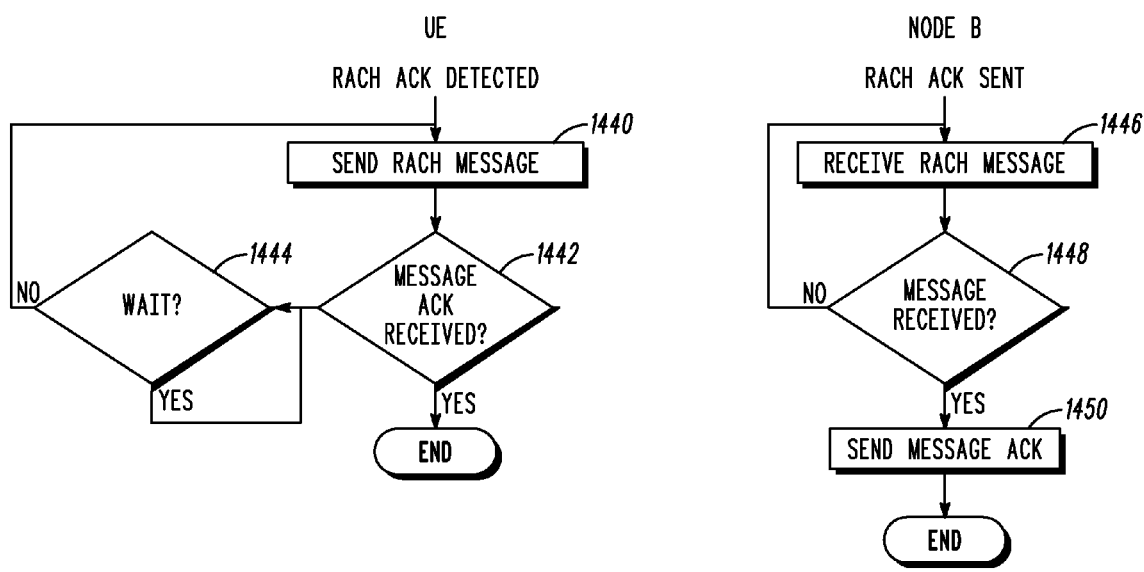
FIG. 18 is the method of contention-based RACH message transmission.

FIG. 18 is the method of contention-based RACH message transmission. UE sends 1440 the RACH message upon RACH ACK is received. In the next step, UE listens 1442 the downlink control channel for RACH message ACK to determine 1444 whether the message is received by Node-B. Node-B will receive 1446 RACH message after the RACH ACK is sent. When the message is received 1448, a RACH message ACK should be sent 1450.

Figure 19:
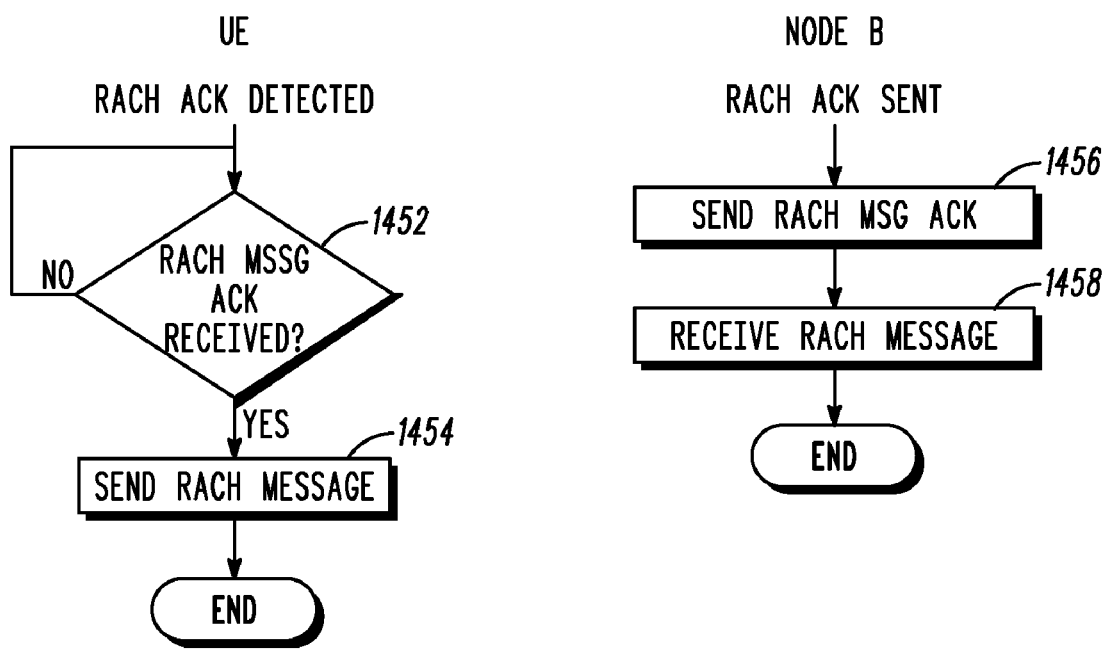
FIG. 19 is ACK-based RACH message transmission approach.

FIG. 19 is ACK-based RACH message transmission approach. A RACH message channel is reserved. UE will wait 1452 for RACH MSG (message) ACK from Node-B for clear of RACH message channel. Once the channel is available, the RACH message is sent 1454. Node-B monitors the availability of the RACH message channel. It will send 1456 MSG ACK and receive 1458 RACH message in the next step.

Advantageously, the present invention provides a CDM type of RACH with a MC-CDMA approach in the EUTRA system. There is no reservation of time slots or sub-carriers involved, which results in zero RACH overhead. The present invention has the capability of working at very low transmitting power (L=600 spreading gain), and any interference introduced in minimal (spreading gain L=600 results in 27.8 dB reduction). In addition, a simple receiver configuration can be used with frequency domain processing.

The present invention provides the advantage of enhancing capacity of the E-UTRA system pursuant to the above embodiments. In particular, providing the RACH preamble sequencing without the need for reserved RACH access resources enhances the peak rate of data transmission and can reduce latency issues for data transmissions. One can also expect to achieve higher sector and user packet call throughput. Notwithstanding these benefits, these embodiments can be realized with only minimal changes to the relevant 3GPP, 3GPP, and 802.16 standards.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including use of hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

While the invention may be susceptible to various modifications and alternative forms, a specific embodiment has been shown by way of example in the drawings and has been described in detail herein. However, it should be understood that the invention is not intended to be limited to the particular forms disclosed, and can be applied equally well to any communication system that can use real-time services. Rather, the invention is to cover all modification, equivalents and alternatives falling within the scope of the invention as defined by the following appended claims.

What is claimed is:

1. A method for initializing a communication in a communication system for random access channel (RACH) access, the method comprising the steps of:

defining at least two sequences derived from at least one constant amplitude zero autocorrelation sequence, wherein the at least two sequences have a same sequence length, and wherein the sequences are derived with different numbers which are relatively prime to the sequence length;

using one of the sequences as a preamble for a RACH;

transmitting the one preamble to a base station for acquisition;

monitoring a downlink control channel from the base station for a fixed amount of time for scheduling information for a RACH message; and sending the RACH message on a physical uplink shared channel at a time and frequency scheduled by the base station.

2. The method of claim 1 wherein the communication system is frequency domain based, and the transmitting step includes transmitting the one preamble to a base station for acquisition in parallel with bearer data.

3. The method of claim 1 wherein the communication system is one of the group frequency domain based communication systems including; OFDMA, DFT-SOFDM, and IFDMA based multiple access systems.

4. The method of claim 1 wherein the defining step includes a plurality of sequences derived from a plurality of constant amplitude zero autocorrelation sequences, and further comprising the step of selecting one of the sequences from the plurality of sequences.

5. The method of claim 1 wherein the defining step includes a plurality of sequences derived from a plurality of constant amplitude zero autocorrelation sequences, and further comprising the step of allocating the sequences for use by sector.

6. The method of claim 1 wherein the defining step uses a general chirp-like sequence for the at least one constant amplitude zero autocorrelation sequence.

7. The method of claim 1 wherein the defining step uses a Chu-sequence for the at least one constant amplitude zero autocorrelation sequence.

8. The method of claim 1 wherein the defining step uses differently delayed constant amplitude zero autocorrelation sequences.

9. The method of claim 1 wherein the sending step includes the base station detecting the sequence of the RACH preamble, and the monitoring step includes receiving an acknowledgement with a preamble sequence number.

10. The method of claim 9 wherein the detection is performed using one of the group of a frequency-domain correlator and a time-domain correlator.

11. The method of claim 1 further comprising the step of setting a minimum transmitter power before the sending step, wherein if the monitoring step does not receive a positive acquisition indicator from the base station, further comprising the substep of increasing the transmitter power with a new access slot and/or a new sequence until a positive acquisition indicator is received from the base station.

12. The method of claim 1 wherein if the monitoring step does not receive a positive acquisition indicator from the base station, further comprising the substep of randomly selecting a new sequence until a positive acquisition indicator is received from the base station.

13. The method of claim 1 wherein the communication system is an Evolved Universal Terrestrial Radio Access communication system, and further comprising a step of repeating the one sequence to form an extended sequence.

* * * * *